United States Patent [19]
Marlor

[11] Patent Number: 6,118,216
[45] Date of Patent: Sep. 12, 2000

[54] LEAD AND ARSENIC FREE BOROSILICATE GLASS AND LAMP CONTAINING SAME

[75] Inventor: Richard C. Marlor, Beverly, Mass.

[73] Assignee: Osram Sylvania Inc., Danvers, Mass.

[21] Appl. No.: 09/085,989

[22] Filed: May 28, 1998

Related U.S. Application Data

[60] Provisional application No. 60/047,372, Jun. 2, 1997.

[51] Int. Cl.[7] .............................. H01J 61/30; C03C 3/091
[52] U.S. Cl. .............................. 313/636; 313/25; 501/64; 501/66
[58] Field of Search .............................. 313/25, 110, 112, 313/493, 636; 501/64, 66

[56] References Cited

U.S. PATENT DOCUMENTS

| | | | |
|---|---|---|---|
| 3,531,677 | 9/1970 | Loughridge | 313/636 |
| 3,984,252 | 10/1976 | Kiefer | 106/54 |
| 4,806,268 | 2/1989 | Kiss et al. | 501/60 |
| 4,925,814 | 5/1990 | Fine | 501/66 |
| 5,182,237 | 1/1993 | Brix | 501/66 |
| 5,557,171 | 9/1996 | Marlor et al. | 313/636 |
| 5,599,753 | 2/1997 | Watzke et al. | 501/66 |
| 5,849,649 | 12/1998 | Poole | 501/67 |

FOREIGN PATENT DOCUMENTS

| | | | |
|---|---|---|---|
| 0 588 000 | 3/1994 | European Pat. Off. | C03C 3/093 |
| 0603933A1 | 6/1994 | European Pat. Off. | C03C 3/087 |
| 0699636A1 | 3/1996 | European Pat. Off. | C03C 3/091 |
| 0 735 007 | 10/1996 | European Pat. Off. | C03C 3/095 |
| 0 749 150 | 12/1996 | European Pat. Off. | H01J 61/30 |

OTHER PUBLICATIONS

JP 08 012369, Patent Abstracts of Japan, vol. 96, No. 5, (May 31, 1996).
*Abstract*, RU 2035414 C (May 20, 1995).

*Primary Examiner*—Ashok Patel
*Attorney, Agent, or Firm*—Robert F. Clark

[57] ABSTRACT

A lead and arsenic free borosilicate glass is provided which is suitable for use in electric arc discharge lamps. The glass is tungsten-sealing and provides desirable protection from ultraviolet radiation. In addition, the glass is resistant to surface scum formation during melting and reduces the amount of batched iron which must be added for UVB protection.

9 Claims, 4 Drawing Sheets

LEAD AND ARSENIC FREE BOROSILICATE GLASS AND LAMP CONTAINING SAME

CROSS-REFERENCE TO RELATED APPLICATION

This application claims the benefit of U.S. Provisional Application No. 60/047,372, filed Jun. 2, 1997.

TECHNICAL FIELD

This invention relates to borosilicate glass compositions and lamps containing same. More particularly, it relates to ultraviolet (UV) absorbing, tungsten-sealing, borosilicate glass compositions for use in the manufacture of electric arc discharge lamps.

BACKGROUND ART

The use of iron oxide in soda-lime glass systems for improved UV absorption is known. In such systems the iron oxide content has been up to 0.12 weight percent (wt. %). In these systems, however, this dopant level is known to reduce visible transmission of the glass, particularly in the 650–750 nm range, by 1–2% with glass thickness of 1 mm, an objectionable feature.

UV absorbing borosilicate glass compositions for electric arc discharge lamps such as high intensity discharge (HID) lamps, typically contain either lead and arsenic oxides or lead and cerium oxides. One conventional lead and arsenic containing borosilicate glass is SG772 which is used for both outer envelope and lamp stem applications. However, both lead and arsenic are toxic materials and it would be very advantageous to be able to manufacture acceptable glasses without using these materials. Arsenic oxide is generally employed in glass compositions as a fining agent for glasses which are difficult to fine (i.e., removal of bubbles). Ceria (>0.15 wt. %) has been used as an acceptable substitute for arsenic oxide for fining glasses, and providing UV absorption. However, ceria-containing borosilicate glasses will solarize under UV irradiation when lead oxide is not in the composition. Solarization produces light absorbing color centers that darken the outer envelope and seriously reduce light output. Elimination of the lead and arsenic oxides has produced workable glasses with adequate sealing capabilities to tungsten; however, such glasses (for example, Schott 8487, which is used for lamp stems and tubulations) do not absorb sufficiently in the UV region to be used as outer envelopes. Additionally, Schott 8487 contains a high concentration of $B_2O_3$ (16.9 wt. %), which makes for a more volatile glass composition, and the potential for surface scum formation when melted in a conventional, gas fired furnace. Surface scum is a highly siliceous glass which forms when the glass volatilizes some of its constituents to form a new, unstable glass composition at or near the surface of the melt. This unstable composition is prone to devitrification, phase separation and low refractive index optical cord. To prevent glass defects, a highly volatile glass is commonly melted in an electric, cold crown furnace which inhibits surface volatilization, and surface scum from forming. Electric melting is however a very expensive solution. Schott 8486 bulb glass contains far less $B_2O_3$ (12 wt. %) and as such is less prone to scum formation, however it does not seal to tungsten wire and does not have sufficient UVB absorption to be used as an outer envelope for HID lamps. As an illustration, the Schott glass enumerated above has a transmittance of 17% at 300 nm, whereas open fixtured lamps employed in the United States must meet the requirements of UL1572 Specification which requires a transmittance of no more than 8% at 300 nm. Additionally, to be an acceptable glass for use as the outer envelopes of electric arc discharge lamps, any absorption at wavelengths approaching the visible, say, above about 375 nm, must be minimized.

A lead and arsenic free borosilicate glass is described in U.S. Pat. No. 5,557,171 to Marlor et al. which is incorporated herein by reference. While this glass is acceptable for use in the outer envelopes of high intensity discharge lamps, it is difficult to produce in large quantities. In particular, in conventional gas fired glass melters, excess batch quantities of iron oxide must be added to achieve the desired level of UV absorption because of the tendency of the UV absorbing $Fe^{3+}$ species to be reduced to $Fe^{2+}$. The higher batch amount of iron oxide leads to an increase in the presence of $Fe^{2+}$ which produces a bluish-green coloration and a reduction in the visible transmission of the glass. Additionally, the glass tends to form surface scum on the melt surface which causes high levels of glass defects such as optical cords, knots and stones.

SUMMARY OF THE INVENTION

It is an object of the invention to obviate the disadvantages of the prior art.

It is another object of the invention to provide a lead and arsenic free borosilicate glass for use in the outer envelopes and stems of electric discharge lamps.

It is a further object of the invention to provide a lead and arsenic free borosilicate glass composition which has increased visible transmittance and is less prone to optical defects.

In accordance with one object of the invention, there is provided a lead and arsenic free borosilicate glass having a composition containing 13.5 to 16.8 weight percent $B_2O_3$, 2.0 to 4.0 weight percent $Al_2O_3$, 2.0 to 5.0 weight percent $Na_2O$, 1.3 to 4.0 weight percent $K_2O$, from 0 to 0.30 weight percent $Li_2O$, 0 to 1.0 weight percent CaO, 0 to 1.0 weight percent MgO, 0.05 to 0.17 weight percent $Fe_2O_3$, 0.005 to 0.060 weight percent $CeO_2$ and the balance $SiO_2$, and wherein the sum of the amounts of $Fe_2O_3$ and $CeO_2$ comprise no greater than 0.19 weight percent and the sum of the amounts of $Na_2O$, $K_2O$ and $Li_2O$ comprise no greater than 7.5 weight percent.

In accordance with another object of the invention, there is provided an electric arc discharge lamp having an arc discharge light source which emits both visible and ultraviolet radiation, the light source being enclosed within an outer envelope comprising a lead and arsenic free borosilicate glass having a composition containing 13.5 to 16.8 weight percent $B_2O_3$, 2.0 to 4.0 weight percent $Al_2O_3$, 2.0 to 5.0 weight percent $Na_2O$, 1.3 to 4.0 weight percent $K_2O$, from 0 to 0.30 weight percent $Li_2O$, 0 to 1.0 weight percent CaO, 0 to 1.0 weight percent MgO, 0.05 to 0.17 weight percent $Fe_2O_3$, 0.005 to 0.060 weight percent $CeO_2$ and the balance $SiO_2$, and wherein the sum of the amounts of $Fe_2O_3$ and $CeO_2$ comprise no greater than 0.19 weight percent and the sum of the amounts of $Na_2O$, $K_2O$ and $Li_2O$ comprise no greater than 7.5 weight percent.

In accordance with still another object of the invention, the outer envelope and the stem of the electric discharge lamp are made of the same lead and arsenic free borosilicate glass.

DESCRIPTION OF THE PREFERRED EMBODIMENTS

Figure 1:
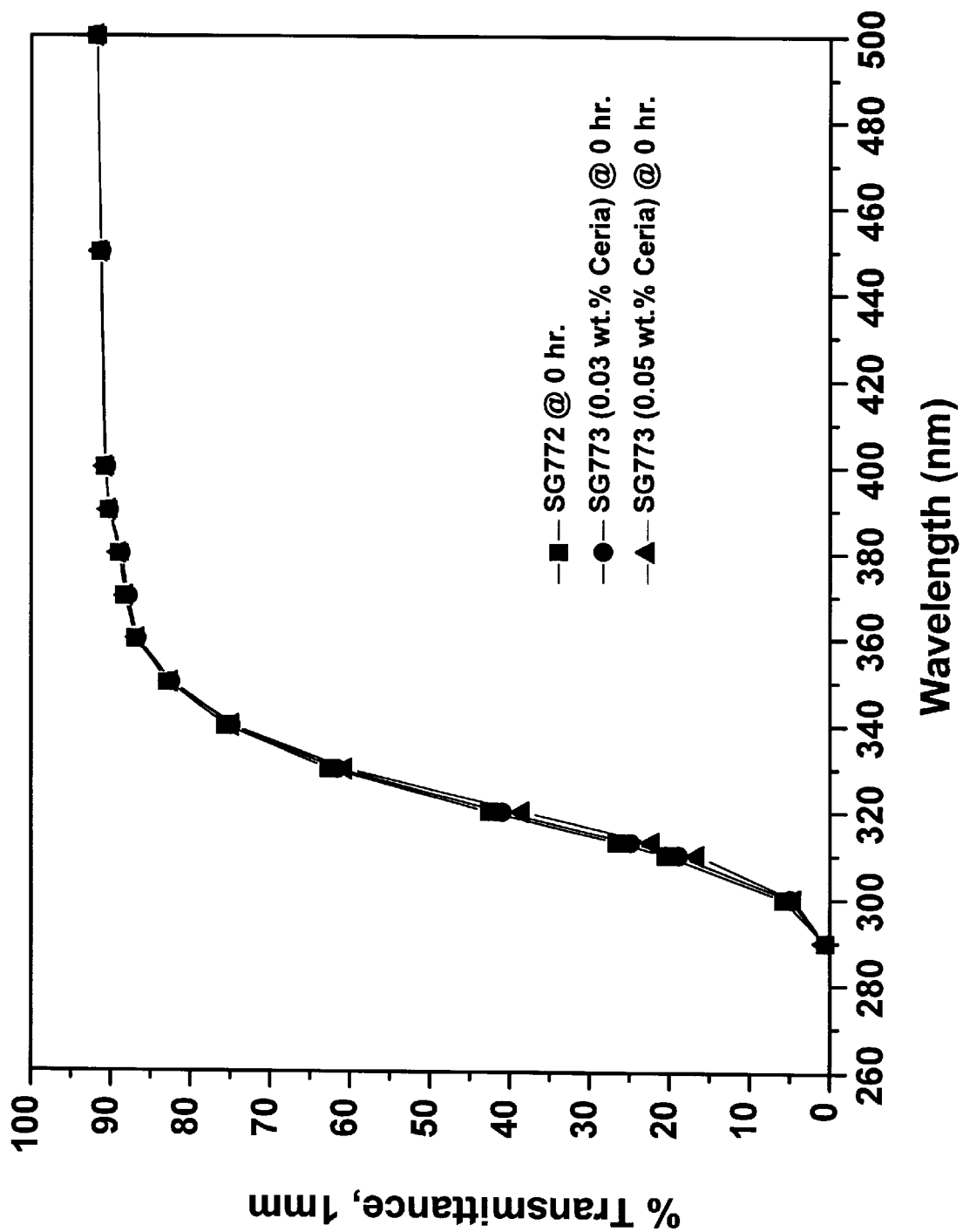
FIG. 1 is a comparison of the transmittance of the borosilicate glass of this invention with the prior art SG 772 lead/arsenic glass prior to solarization.

For a better understanding of the present invention, together with other and further objects, advantages and capabilities thereof, reference is made to the following disclosure and appended claims taken in conjunction with the above-described drawings.

A lead and arsenic free borosilicate glass has been developed which is suitable for use in electric arc discharge lamps. The glass is resistant to scum formation and significantly reduces (by about 40%) the amount of batched iron oxide required for UVB protection. The lower iron content translates into a 1% increase in visible transmission (1 mm thickness) which directly translates into increased lumen output. The glass is tungsten sealing which makes it suitable for both outer envelope and stem sealing applications. Hence, only one glass composition is required in the lamp making operation.

Compared to the glass described in U.S. Pat. No. 5,557,171, the alumina ($Al_2O_3$) content of the glass has been increased to prevent glass defects associated with scum formation, and ceria ($CeO_2$) has been added to promote the oxidation of iron in the melt and to absorb UVB without lamp lumen losses from solarization. In particular, the glass of this invention contains 13.5 to 16.8 weight percent (wt. %) boron oxide ($B_2O_3$), 2.0 to 4.0 wt. % alumina ($Al_2O_3$), 2.0 to 5.0 wt. % sodium oxide ($Na_2O$), 1.3 to 4.0 wt. % potassium oxide ($K_2O$), 0 to 0.30 wt. % lithium oxide ($Li_2O$), 0 to 1.0 wt. % calcium oxide (CaO), 0 to 1.0 wt. % magnesium oxide (MgO), 0.05 to 0.17 wt. % iron oxide ($Fe_2O_3$), 0.005 to 0.060 wt. % ceria ($CeO_2$) and the balance silica ($SiO_2$). The composition is further defined in that the sum of the amounts of iron oxide and ceria is no greater than 0.19 wt. % and the sum of the amounts of sodium oxide, potassium oxide and lithium oxide is no greater than 7.5 wt. %. A high $K_2O/Na_2O$ mole ratio (about 0.60) is preferred to maximize electrical resistivity for lamp stem applications.

According to the invention, a minor concentration of ceria, 0.06 wt. % or less, is substituted for an equal amount of iron oxide to produce a glass free from the normal bluish-green coloration produced by the presence of $Fe^{2+}$. In these limited concentrations, the ceria ($Ce^{3+}$ and $Ce^{4+}$) absorbs UV radiation without harmful solarization, and helps to oxidize $Fe^{2+}$ in the melt to produce UV absorbing $Fe^{3+}$. The UV absorption of the glass is controlled by the total concentration of $Fe^{3+}$, $Ce^{3+}$ and $Ce^{4+}$. While not wishing to be bound by theory, it is believed that the ceria controls the oxidation of iron during glass melting through the following oxidation-reduction reaction:

$$Ce^{4+}+Fe^{2+}\rightarrow Ce^{3+}+Fe^{3+}$$

During the operation of an electric arc discharge lamp, an active photochemical process occurs whereby the high energy UV radiation emitted by the light source interacts with the glass to eject photoelectrons which can result in solarization of the glass. As described above, glasses containing ceria tend to be susceptible to solarization therefore the amount of ceria in the glass is kept low so that solarization of the borosilicate outer envelope is minimized over the life of the lamp.

Figure 2:
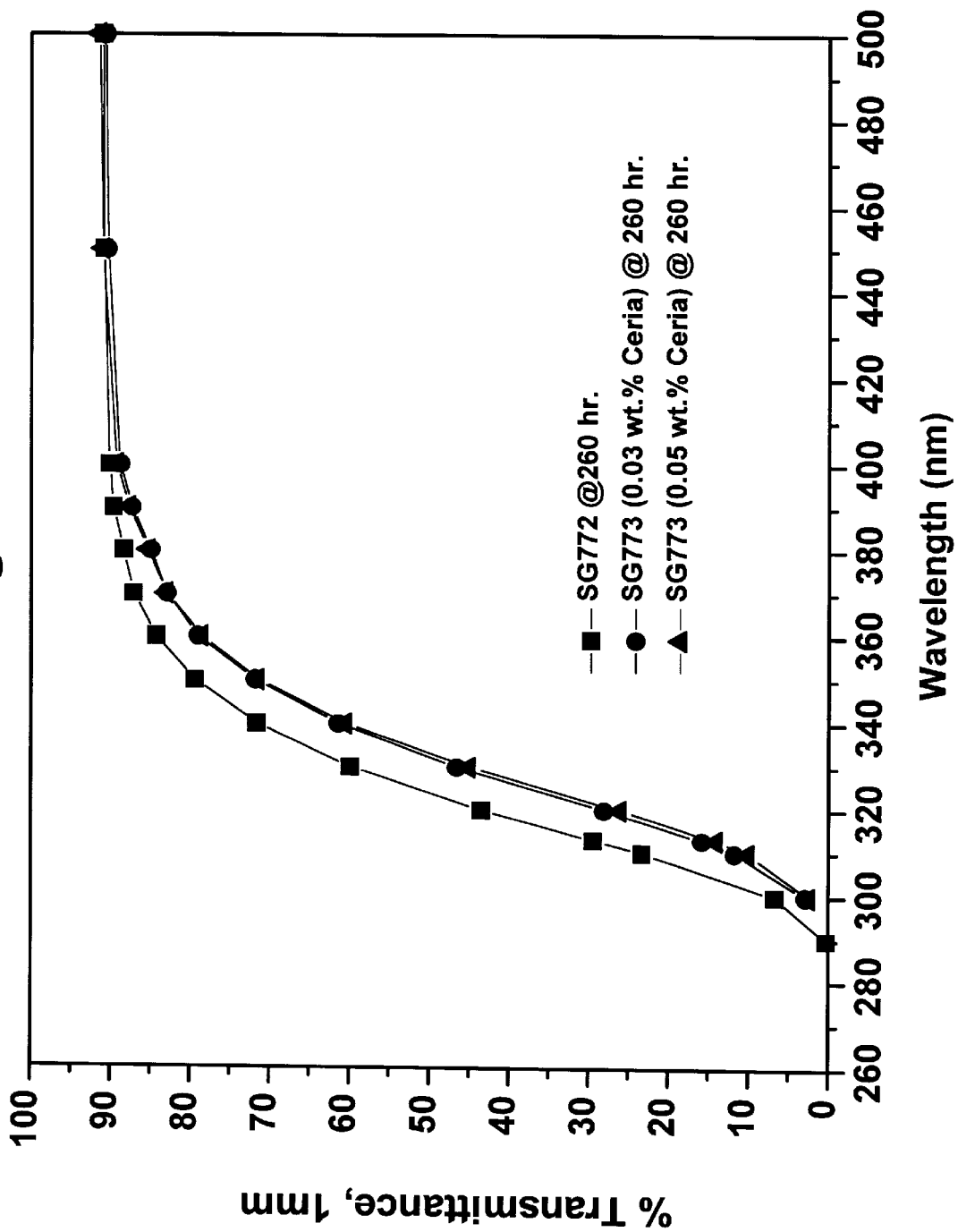
FIG. 2 is a comparison of the transmittance of the borosilicate glass of this invention with the prior art SG 772 lead/arsenic glass after solarization.

Some solarization of the outer envelope is desirable during the life of the lamp to increase the UVB (260–320 nm) and UVA (320–400 nm) absorption. For example, when compared to the conventional SG772 lead/arsenic borosilicate glass, an outer envelope made with the glass of this invention in a 400 W metalarc lamp will provide twice the UV protection of the SG772 glass at 0 hours of lamp operation, and five times the UV protection of the SG772 glass after 100 hours. As can be seen in FIGS. 1 and 2, SG772 becomes more UV transmissive during aging whereas SG773 becomes more UV absorptive. In other applications, it is desirable to reduce solarization to provide higher levels of blue light, e.g., stimulating plant growth. Since the solarization absorption curve shifts to longer wavelengths (red shifts) at high operating temperatures effecting a greater absorption of blue light, a lower amount of ceria is preferred (about 0.020 wt. %) for lamps designed for such applications.

The alumina content of the glass, 2.0 to 4.0 wt. %, is at least 40% greater than the glass disclosed in U.S. Pat. No. 5,557,171. As the glass composition approaches the 16.8 wt. % $B_2O_3$ and 2.0 wt. % $Al_2O_3$ limits, tendencies towards increased melt volatilization and phase separation begin to appear. The scum formation problem associated with that prior art glass is believed to have been caused by the high level of $BO_3$ structural units associated with the higher boron composition. It is further believed that these $BO_3$ structures are unstable at higher temperatures and as a result the surface glass composition formed during melting is prone to phase separation. The addition of alumina for boron oxide is believed to have tightened the glass network resulting in a more stable structure consisting almost entirely of $BO_4$ tetrahedrons.

Table 1 compares a preferred composition of the glass of this invention, designated SG773, with several prior art glasses: SG772, Schott 8486, Schott 8487 and AS-16 (U.S. Pat. No. 5,557,171). The physical properties of the SG773 composition are compared with other tungsten-sealing glasses in Table 2.

TABLE 1

| Oxides | SG772 (wt. %) | Schott 8486 (wt. %) | Schott 8487 (wt. %) | AS-16 (wt. %) | SG773 (wt. %) |
|---|---|---|---|---|---|
| $SiO_2$ | 74.0 | 76.1 | 75.9 | 75.0 | 75.3 |
| $Na_2O$ | 3.3 | 3.9 | 3.8 | 3.9 | 2.9 |
| $K_2O$ | — | 1.3 | 1.5 | 1.5 | 2.6 |
| $Li_2O$ | 0.15 | — | — | 0.15 | 0.20 |
| $B_2O_3$ | 14.9 | 11.0 | 16.9 | 17.0 | 14.9 |
| $Al_2O_3$ | 1.4 | 3.6 | 1.4 | 1.4 | 3.0 |
| CaO | — | 1.2 | 0.1 | 0.6 | 0.6 |
| MgO | — | 0.4 | 0.4 | 0.4 | 0.4 |
| $Fe_2O_3$ | 0.04 | 0.08 | 0.03 | 0.13 | 0.10 |
| $CeO_2$ | — | — | — | — | 0.020 |
| BaO | — | 2.4 | — | — | — |
| PbO | 5.5 | — | — | — | — |
| $As_2O_3$ | 0.7 | — | — | — | — |

TABLE 2

|  | SG772 | Schott 8487 | SG773 |
|---|---|---|---|
| Thermal Expansion, 0–300° C. ($\times 10^{-7}$ in/in/° C.) | 35.8 | 38.0 | 39.0 |
| Tungsten Seals (psi, tension) | | | |
| Radial Stress (tension) | 745 | 730 | 495 |
| Axial Stress (tension) | 176 | 68 | 44 |
| Electrical Resistivity | | | |
| Log (ohm-cm) @ 250° C. | 8.8 | 8.3 | 8.8 |
| Log (ohm-cm) @ 350° C. | 7.2 | 6.9 | 7.2 |
| Viscosity (log poise) | | | |
| 2.5 | 1567° C. | 1517° C. | 1599° C. |
| 4.0 (working point) | 1159° C. | 1135° C. | 1181° C. |
| 7.6 (softening point) | 755° C. | 774° C. | 771° C. |
| $T_{4.0}$–$T_{7.6}$ (working range) | 404° C. | 361° C. | 410° C. |
| Annealing Point | 523° C. | 542° C. | 542° C. |

The data in Table 2 demonstrates that the borosilicate glass of this invention, SG773, exhibits tungsten sealing properties comparable to the other tungsten-sealing glasses, SG772 and Schott 8487. SG773 high temperature viscosity is slightly higher than SG772, as is the annealing point. This viscosity relationship requires slightly higher temperatures for glass working, however since the annealing point is also slightly higher annealing fires used in high speed lamp manufacturing processes need not be relocated or reset. Moreover, since the glass does not contain lead or arsenic, it does not blacken like SG772 during sealing.

Figure 3:
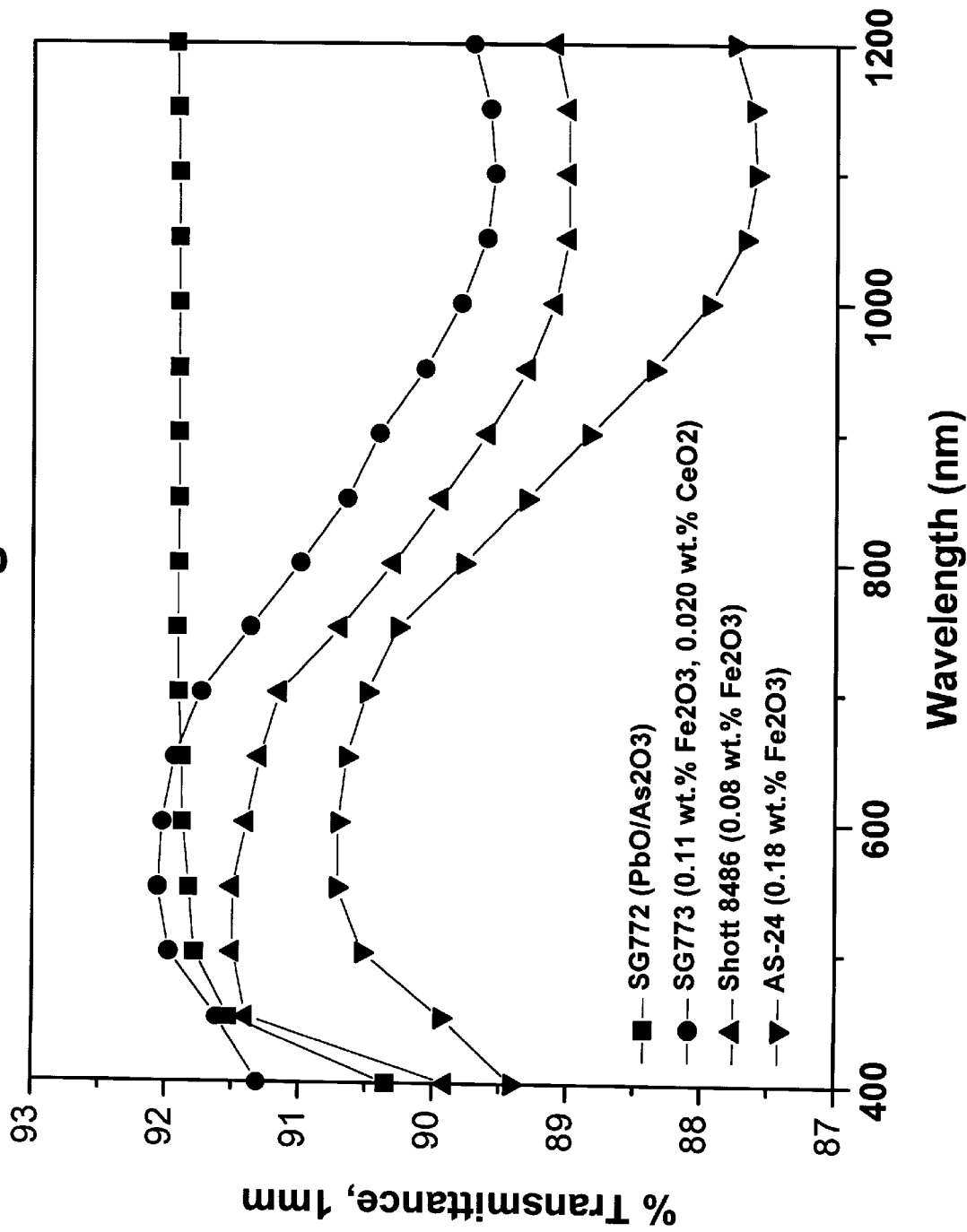
FIG. 3 is a comparison of the transmittance of the borosilicate glass of this invention with the prior art glasses SG772 and AS-24 (a glass made according to U.S. Pat. No. 5,557,171 with a high iron content for UVB absorption).

FIGS. 1 and 2 compare the transmittance curves for two SG773 compositions, (0.03 and 0.05 wt. % $CeO_2$) with SG772. FIG. 1 shows the transmittance curves for the unsolarized glasses. FIG. 2 shows the transmittance curves for the solarized glasses (260 hours of UV irradiation by a 1000 W iron iodide metal halide lamp). FIG. 3 compares the visible/near infra-red transmittance of the SG773 glass with SG772 and AS-24, a glass made according to U.S. Pat. No. 5,557,171 with a high iron content for UVB absorption. Comparing Schott 8486 with SG773 shows that a small amount of $CeO_2$ allows for higher concentrations of $Fe_2O_3$ in the glass without loss in visible transmission. The above data clearly shows that the SG773 glass may be substituted for the lead/arsenic SG772 in electric arc discharge applications. The data further demonstrate the improved transmittance of the SG773 glass over the glass described in U.S. Pat. No. 5,557,171.

Figure 4:
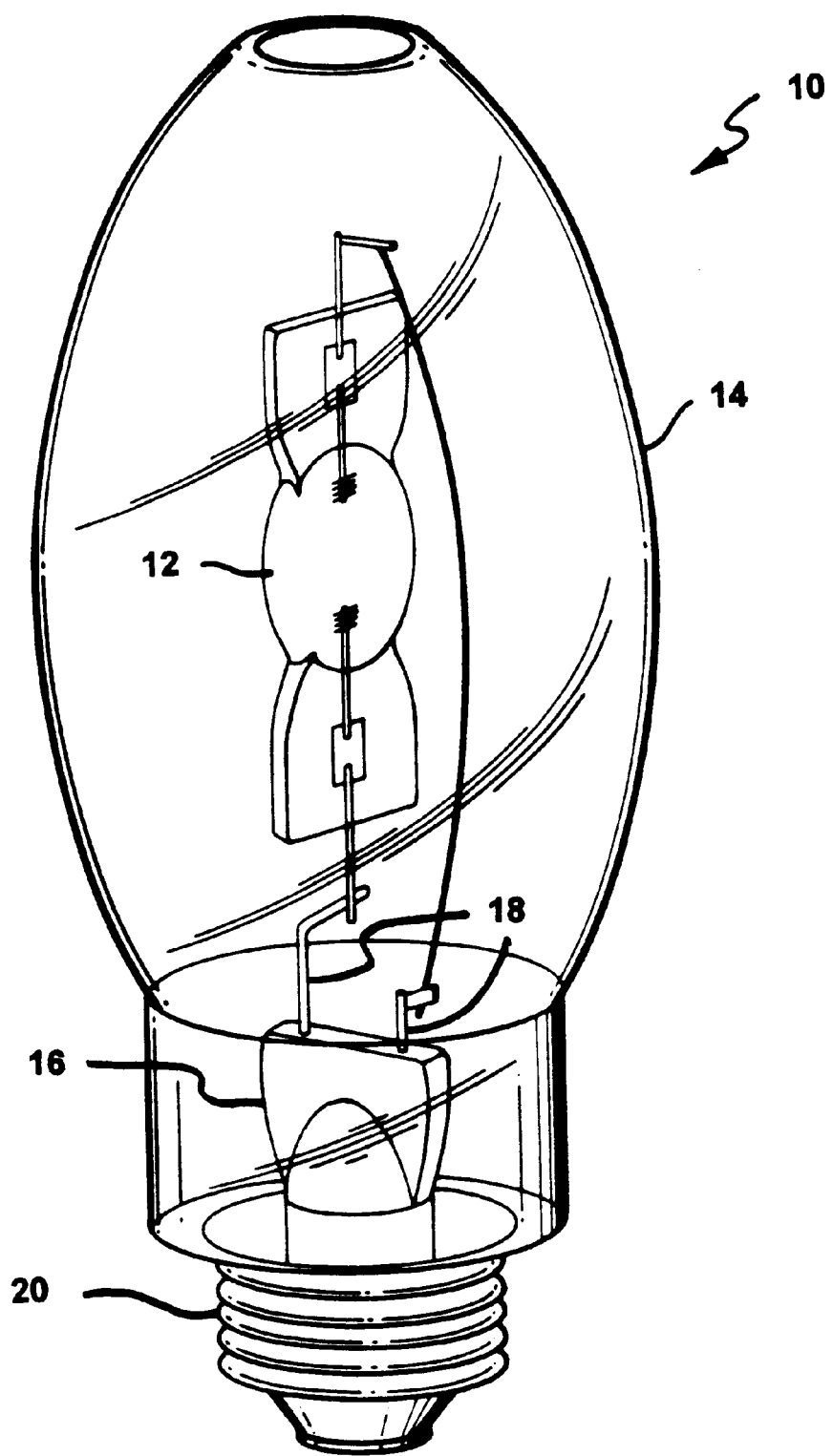
FIG. 4. is a diagrammatic, perspective view of an electric arc discharge lamp.

FIG. 4 illustrates an embodiment of the invention wherein an electric arc discharge lamp 10 has an arc tube 12 enclosed within a borosilicate glass outer envelope 14. The stem 16 is made of a tungsten-sealing borosilicate glass and is sealed at its periphery to the outer envelope 14. Preferably, the outer envelope 14 and the stem 16 are made of the same borosilicate glass in order to reduce manufacturing costs. Lead wires 18 are sealed in stem 16 and are electrically connected to arc tube 12 and base 20. When the lamp is operated, electrical energy is transmitted from the base 20 through lead wires 18 in stem 16 to arc tube 12. The arc tube 12, when operating, emits visible and ultraviolet radiation.

While there has been shown and described what are at the present considered the preferred embodiments of the invention, it will be obvious to those skilled in the art that various changes and modifications may be made therein without departing from the scope of the invention as defined by the appended claims.

I claim:

1. A lead and arsenic free borosilicate glass having a composition containing 13.5 to 16.8 weight percent $B_2O_3$, 2.0 to 4.0 weight percent $Al_2O_3$, 2.0 to 5.0 weight percent $Na_2O$, 1.3 to 4.0 weight percent $K_2O$, from 0 to 0.30 weight percent $Li_2O$, 0 to 1.0 weight percent CaO, 0 to 1.0 weight percent MgO, 0.05 to 0.17 weight percent $Fe_2O_3$, 0.005 to 0.060 weight percent $CeO_2$ and the balance $SiO_2$, and wherein the sum of the amounts of $Fe_2O_3$ and $CeO_2$ comprise no greater than 0.19 weight percent and the sum of the amounts of $Na_2O$, $K_2O$ and $Li_2O$ comprise no greater than 7.5 weight percent.

2. A glass according to claim 1 wherein the composition contains about 0.020 weight percent $CeO_2$.

3. A glass according to claim 1 wherein the mole ratio of $K_2O$ to $Na_2O$ is about 0.60.

4. A glass according to claim 1 wherein the composition contains 0.10 wt. % $Fe_2O_3$ and 0.020 wt. % $CeO_2$.

5. A glass according to claim 4 wherein the composition contains 14.9 wt. % $B_2O_3$, 2.9 wt. % $Na_2O$, 2.6 wt. % $K_2O$, 0.20 wt. % $Li_2O$, 0.6 wt. % CaO, 0.4 wt. % MgO, and 3.0 wt. % $Al_2O_3$.

6. A glass according to claim 1 wherein the glass has a thermal expansion between 0 and 300° C. of $39.0 \times 10^{-7}$ in/in/° C. and a log electrical resistivity of 8.8 ohm-cm at 250° C.

7. An electric arc discharge lamp having an arc discharge light source which emits both visible and ultraviolet radiation, the light source being enclosed within an outer envelope comprising a lead and arsenic free borosilicate glass having a composition containing 13.5 to 16.8 weight percent $B_2O_3$, 2.0 to 4.0 weight percent $Al_2O_3$, 2.0 to 5.0 weight percent $Na_2O$, 1.3 to 4.0 weight percent $K_2O$, from 0 to 0.30 weight percent $Li_2O$, 0 to 1.0 weight percent CaO, 0 to 1.0 weight percent MgO, 0.05 to 0.17 weight percent $Fe_2O_3$, 0.005 to 0.060 weight percent $CeO_2$ and the balance $SiO_2$, and wherein the sum of the amounts of $Fe_2O_3$ and $CeO_2$ comprise no greater than 0.19 weight percent and the sum of the amounts of $Na_2O$, $K_2O$ and $Li_2O$ comprise no greater than 7.5 weight percent.

8. An electric arc discharge lamp according to claim 7 wherein the lamp further comprises a stem which is sealed to the outer envelope and is comprised of the borosilicate glass.

9. An electric arc discharge lamp according to claim 8 wherein the glass has a thermal expansion between 0 and 300° C. of $39.0 \times 10^{-7}$ in/in/° C. and a log electrical resistivity of 8.8 ohm-cm at 250° C.

* * * * *